United States Patent
Sui et al.

(10) Patent No.: US 12,039,321 B2
(45) Date of Patent: Jul. 16, 2024

(54) IMAGE OPTIMIZATION FOR PIPELINE WORKLOADS

(71) Applicant: International Business Machines Corporation, Armonk, NY (US)

(72) Inventors: Guang Han Sui, Beijing (CN); Jin Chi He, Xian (CN); Peng Hui Jiang, Beijing (CN); Jun Su, Beijing (CN); Gang Tang, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 17/936,957

(22) Filed: Sep. 30, 2022

(65) Prior Publication Data

US 2024/0111511 A1   Apr. 4, 2024

(51) Int. Cl.
  *G06F 8/65*    (2018.01)
  *G06F 9/48*    (2006.01)

(52) U.S. Cl.
  CPC .............. *G06F 8/65* (2013.01); *G06F 9/4843* (2013.01)

(58) Field of Classification Search
  None
  See application file for complete search history.

(56) References Cited

U.S. PATENT DOCUMENTS

| | | | |
|---|---|---|---|
| 10,303,499 B2 | 5/2019 | Jobi et al. | |
| 10,303,657 B2 * | 5/2019 | Huang | G06F 8/63 |
| 10,379,841 B2 | 8/2019 | Wong et al. | |
| 11,010,149 B2 | 5/2021 | Viana et al. | |
| 11,762,850 B2 | 9/2023 | Rupprecht et al. | |
| 11,928,082 B1 * | 3/2024 | Sui | G06F 16/13 |
| 2019/0114164 A1 * | 4/2019 | Wong | G06F 8/658 |
| 2019/0146772 A1 * | 5/2019 | Griffin | G06F 8/71 717/121 |
| 2019/0235897 A1 | 8/2019 | Goel | |

(Continued)

FOREIGN PATENT DOCUMENTS

| | | | | |
|---|---|---|---|---|
| CN | 106528224 A * | 3/2017 | | G06F 8/65 |
| CN | 112771622 A | 5/2021 | | |

(Continued)

OTHER PUBLICATIONS

PCT International Search Report and Written Opinion, dated Nov. 29, 2023, regarding Application No. PCT/CN2023/118728, 8 pages.

(Continued)

*Primary Examiner* — Philip Wang
*Assistant Examiner* — Rongfa P Wang
(74) *Attorney, Agent, or Firm* — Yee & Associates, P.C.

(57) ABSTRACT

A computer implemented method, apparatus, system, and computer program product manages updates to images. A computer system determines shared layers present between the images selected for update management. The images comprise executable code that are run to create containers. The computer system detects a change in a shared layer in the shared layers for an image in the images. The computer system updates the shared layer in the shared layers in a set of the images having the shared layer in response to detecting the change to the shared layer for the image. According to other illustrative embodiments, a computer system and a computer program product for managing updates to images are provided.

20 Claims, 15 Drawing Sheets

(56) References Cited

U.S. PATENT DOCUMENTS

| | | | | |
|---|---|---|---|---|
| 2019/0251190 A1* | 8/2019 | Scrivano | ............... | G06F 16/162 |
| 2019/0354389 A1* | 11/2019 | Du | ...................... | G06F 9/45545 |
| 2020/0027210 A1* | 1/2020 | Haemel | ................... | G06F 9/547 |
| 2020/0278877 A1* | 9/2020 | Scrivano | ................... | G06F 8/63 |
| 2021/0096894 A1* | 4/2021 | Rupprecht | ............ | G06F 9/5077 |
| 2022/0147560 A1* | 5/2022 | Chen | ..................... | G06F 16/535 |
| 2023/0409308 A1* | 12/2023 | Zhu | ....................... | G06F 11/323 |

FOREIGN PATENT DOCUMENTS

| | | | |
|---|---|---|---|
| CN | 113504916 A | | 10/2021 |
| CN | 113821488 A | | 12/2021 |
| CN | 114528065 A | | 5/2022 |
| CN | 115291925 A | * | 11/2022 |

OTHER PUBLICATIONS

Skourtis et al., "Carving perfect layers out of docker images," HotCloud'19: Proceedings of the 11th USENIX Conference on Hot Topics in Cloud Computing, Jul. 8, 2019, 17 pages.

Tran, "How to Automatically Update Docker Container Images with Watchtower on Ubuntu 22.04," DigitalOcean, May 24, 2022, accessible at: https://www.digitalocean.com/community/tutorials/how-to-automatically-update-docker-container-images-with-watchtower-on-ubuntu-22-04, last accessed on Sep. 30, 2022, 20 pages.

Zheng et al., "Wharf: Sharing Docker Images in a Distributed File System," SoCC '18: Proceedings of the ACM Symposium on Cloud Computing, Oct. 2018, pp. 174-185.

* cited by examiner

| | LAYER | UID | LAYER CREATION DATE | IMAGE NAME |
|---|---|---|---|---|
| 510 → | LINUX | UIDA | 16.02.2022 5:18 | IMAGE X, IMAGE Y, IMAGE Z |
| 512 → | CENTOS:7 | UIDB | 7.04.2022 10:18 | IMAGE A, IMAGE C, IMAGE F |
| 514 → | DATA COLLECTION | UIDC | 11.06.2022 17:21 | IMAGE A, IMAGE X |

IMAGE OPTIMIZATION FOR PIPELINE WORKLOADS

BACKGROUND

1. Field

The disclosure relates generally to an improved computer system and more specifically optimizing pipeline workloads. Still more particularly, the present disclosure relates to a computer implemented method, apparatus, system, and computer program product for managing image optimization for pipeline workloads.

2. Description of the Related Art

A container orchestration environment, such as, for example, Kubernetes® (a registered trademark of the Linux Foundation of San Francisco, California), provides a platform for automating deployment, scaling, and operations of containers across clusters of host nodes. A host node is a machine, either physical or virtual, where containers are deployed. A pod is a group of one or more containers, with shared storage and network resources, and a specification for how to run the containers. The containers can run workloads. Images represent the executable code that are run to create the containers.

Pipeline workloads are often run in container orchestration environments. A pipeline workload can include any type of workload. For example, the workload can be artificial intelligence processing, training machine learning model, natural language processing, image processing, computer vision, scientific calculations, forecasts, predictions, recommendations, data processing, transaction processing, and the like.

A pipeline workload divides the workload into many steps. These steps can be executed in a sequence for the pipeline workload to obtain a result. In a container orchestration environment, containers are used to implement these steps. Each container is for a step in the steps performed by the pipeline workload. For example, pipeline workloads are used with artificial intelligence processing in which the workload is divided into steps that are executed in a sequence to perform the process.

With a pipeline workload, an image is present for each step. When hundreds or thousands of steps are present, maintaining this number of images can be difficult. For example, if an operating system level patch is used on some images, these images are currently patched one by one. This process is complex and error prone. For example, 1000 images are present and 800 of the images using a first Linux version and 200 of the image use a second Linux version. Currently, if the first Linux version needs a patch, the user repeats building the image with the patch and uploads the image to a Docker server 800 times. This process is tedious, time consuming, and error prone.

One solution involves handling patch requests using scripts. The user writes a build with the script that has the build and upload logic. The script is run for each image. However, using scripts can still result in errors because some images with the first Linux version may have already been changed while some images with the first Linux version may have not been changed with update. Even with scripts, a collection of image information still needs to be manually collected by a user as to which images need changes. For example, the user checks all of the images to identify which images need changes and which ones have already been updated. Maintaining this list is tedious, time consuming, and can be error prone.

As another example, the user can include a script in the image. Once the image is loaded to run the container, the script is executed before running the image to create the container. The script finds the patch and applies the patch to the files containing the code for the container before the container runs. This process of obtaining a patch and patching the files in the image before creating the container uses resources such as time and bandwidth. This approach has a performance impact that increases as the number of images that have scripts applying patches increase. When thousands of images are present for a pipeline workload, the performance impact can be severe.

Therefore, it would be desirable to have a method and an apparatus that take into account at least some of the issues discussed above, as well as other possible issues. For example, it would be desirable to have a method and an apparatus that overcome a technical problem with maintaining images.

SUMMARY

According to one illustrative embodiment, a computer implemented method manages updates to images. A computer system determines shared layers present between the images selected for update management. The images comprise executable code that are run to create containers. The computer system detects a change in a shared layer in the shared layers for an image in the images. The computer system updates the shared layer in the shared layers in a set of the images having the shared layer in response to detecting the change to the shared layer for the image. According to other illustrative embodiments, a computer system and a computer program product for managing updates to images are provided. As a result, the illustrative embodiments can provide a technical effect of increasing the performance by reducing errors in updated images and increasing performance in updating images by eliminating a need to update the code in each image individually.

The illustrative embodiments can permissively update the shared layer in the shared layers in the set of the images having the shared layer in response to detecting the change to the shared layer for the image by determining a new unique identifier for the shared layer for the image that has changed; identify the set of the images that have the shared layer that has changed; and update the shared layer for the set of the images using the new unique identifier for the shared layer that has changed. As a result, the illustrative embodiments can provide a technical effect of increasing the performance by reducing errors in updated images and increasing performance in updating images by eliminating a need to update code in each image individually.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
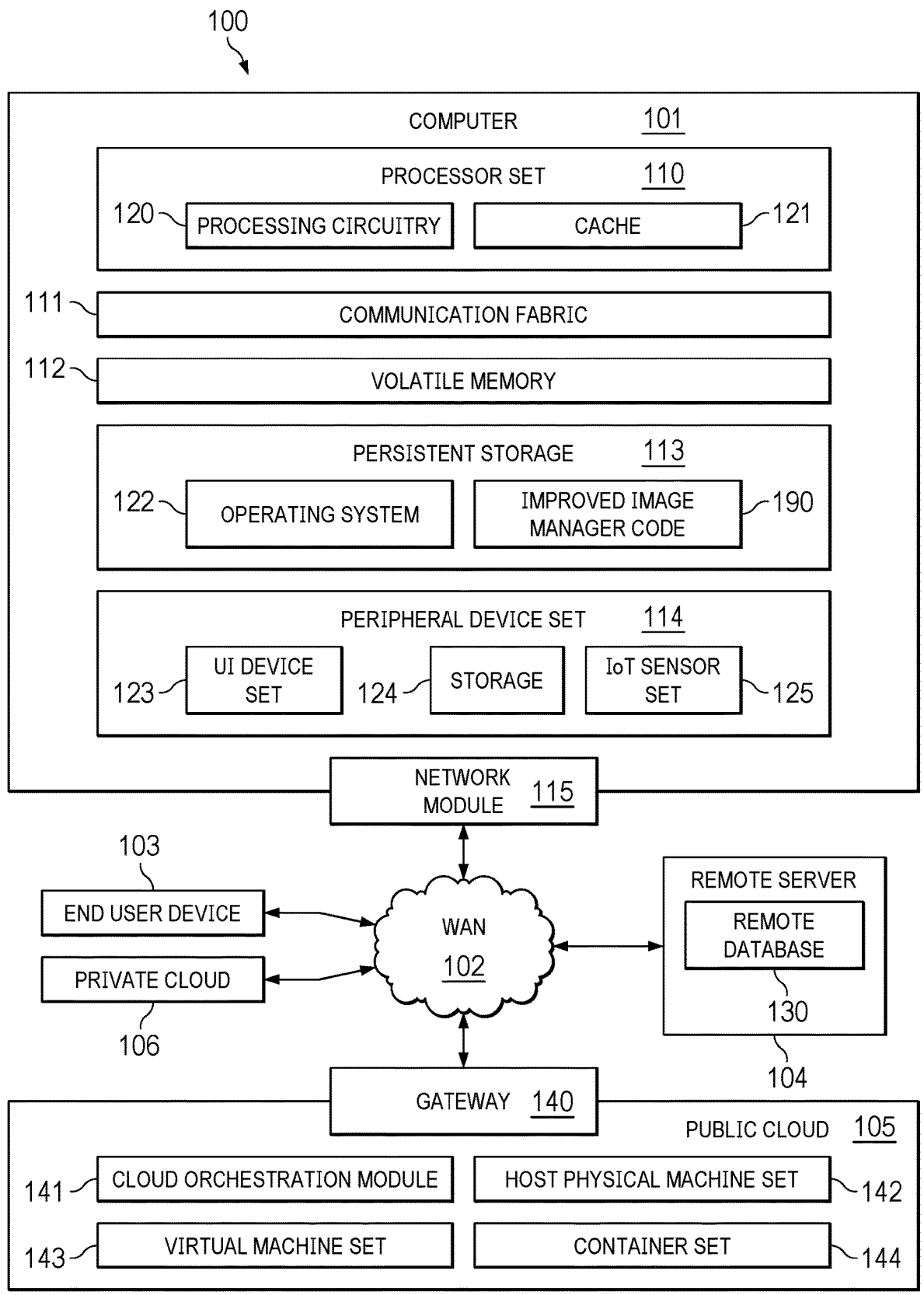
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as improved image manager code 190. In this illustrative example, improved image manager code 190 operates to manage images. For example, images or pipelines workload can be managed by improved image manager code 190. In the illustrative example, improved image manager code 190 can detect that a shared layer in an image is updated and automatically update shared layers corresponding to that shared layer in other images containing the shared layers. In addition to improved image manager code 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and improved image manager code 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in improved image manager code 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in improved image manager code 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments provide a method, apparatus, system, and computer program product for managing updates to images. A computer system determines shared layers present between the images selected for update management. The images comprise executable code that are run to create containers. The computer system detects a change in a shared layer in the shared layers for an image in the images. The computer system updates the shared layer in the shared layers in a set of images having the shared layer in response to detecting the change to the shared layer for the image. One or more of the illustrative examples described herein can provide a technical effect of increasing the performance by reducing errors in updating images and increasing performance updating images by eliminating a need to update the code in each image individually.

As used herein, a "set of" when used with reference to items means one or more items. For example, a set of images is one or more images.

Figure 2:
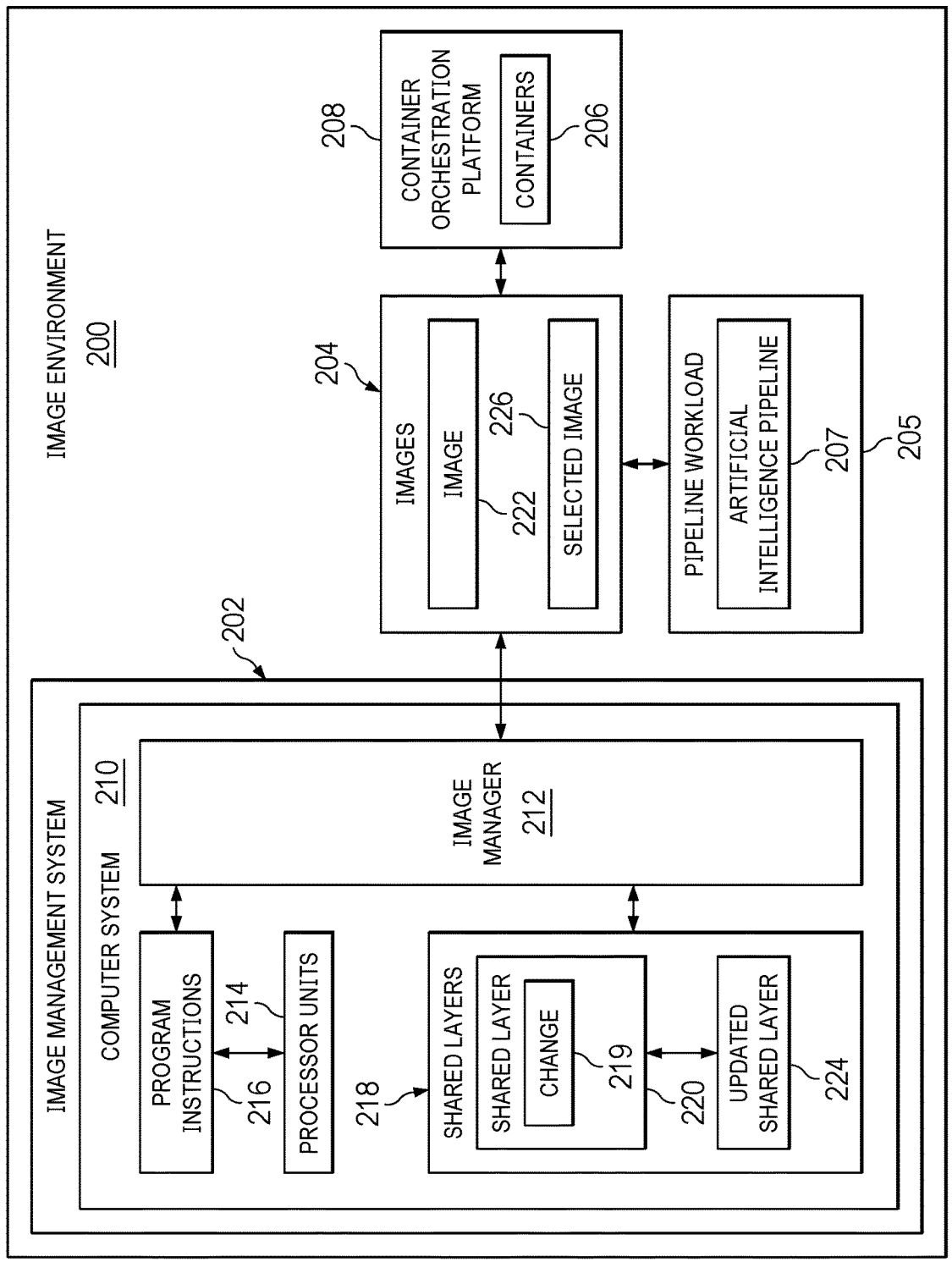
FIG. 2 is a block diagram of an image environment in accordance with an illustrative embodiment.

With reference now to FIG. 2, a block diagram of an image environment is depicted in accordance with an illustrative embodiment. In this illustrative example, image environment 200 includes components that can be implemented in hardware such as the hardware shown computing environment 100 in FIG. 1.

In this illustrative example, image management system 202 in image environment 200 manages images 204. As depicted, images 204 comprises executable code that is run to create containers 206 from images 204. In this example, the code in images 204 is contained in binary files, libraries, and other types of files that can be executed.

In this illustrative example, images 204 can form pipeline workload 205. In one illustrative example, pipeline workload 205 formed using images 204 can be artificial intelligence pipeline 207. In this example, images 204 are for containers 206 that perform steps in artificial intelligence pipeline 207. When artificial intelligence pipeline 207 includes a machine learning model, steps such as retrieving data, dataset construction, clean data, transform data, model training, model evaluation, and other steps can be performed in artificial intelligence pipeline 207. Additionally, when artificial intelligence pipeline 207 involves training the machine learning model, the training can include steps such as dataset splitting, algorithm selection, analyzing training data, and hyperparameter tuning.

Containers 206 are containers that run in container orchestration platform 208, which can be for example, a Kubernetes® architecture, environment, or the like. However, it should be understood that description of illustrative examples using Kubernetes® is meant as an example architecture only and not as a limitation on illustrative embodiments. In this example, containers 206 are for workloads that are applications running in container orchestration platform 208.

As depicted, image management system 202 comprises computer system 210 and image manager 212. Image manager 212 is located in computer system 210.

Image manager 212 can be implemented in software, hardware, firmware or a combination thereof. When software is used, the operations performed by image manager 212 can be implemented in program instructions configured to run on hardware, such as a processor unit. When firmware is used, the operations performed by image manager 212 can be implemented in program instructions and data and stored in persistent memory to run on a processor unit. When hardware is employed, the hardware can include circuits that operate to perform the operations in image manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As used herein, the phrase "at least one of", when used with a list of items, means different combinations of one or more of the listed items can be used and only one of each item in the list can be needed. In other words, "at least one of" means any combination of items and number of items can be used from the list, but not all of the items in the list are required. The item can be a particular object, thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B and ten of item C; four of item B and seven of item C; or other suitable combinations.

As depicted, computer system 210 includes a number of processor units 214 that are capable of executing program instructions 216 implementing processes in the illustrative examples. As used herein a processor unit in the number of processor units 214 is a hardware device and is comprised of hardware circuits such as those on an integrated circuit that respond and process instructions and program instructions that operate a computer. When the number of processor units 214 execute program instructions 216 for a process, the number of processor units 214 is one or more processor units that can be on the same computer or on different computers. In other words, the process can be distributed between processor units on the same or different computers in a computer system.

Further, the number of processor units 214 can be of the same type or different type of processor units. For example, the number of processor units 214 can be selected from at least one of a single core processor, a dual-core processor, a multi-processor core, a general-purpose central processing unit (CPU), a graphics processing unit (GPU), a digital signal processor (DSP), or some other type of processor unit.

Image manager 212 can manage changes to images 204. In this illustrative example, images 204 have been selected for management with respect to shared layers 218 present between images 204. Shared layers 218 in images 204 means that these layers are present between all or a subset of images 204. Image manager 212 determines shared layers 218 that present between the images 204 selected for update management.

In this example, image manager 212 detects change 219 in shared layer 220 in shared layers 218 in image 222 in images 204. Change 219 can result, for example, from a patch in the form of an operating system, updating a library, or other change to shared layer 218. Shared layer 220 with change 219 becomes updated shared layer 224.

In this example, image manager 212 updates shared layer 220 in shared layers 218 in a set of images 204 having shared layer 220 in response to detecting the change to shared layer by 220 in image 222.

The updating for the set of images 204 having shared layer 220 can occur by including shared layer 220 with change 219 in the set of images 204 of shared layer 220 without change 219. In other words, executable code for the corresponding layer in the set of images 204 does not need to be patched. Instead, shared layer 220 with change 219 can be used in place of shared layer 220 without change 219 that are present in the set of images 204 prior to the updating performed by image manager 212.

For example, images 204 comprises 600 images 204 and 350 of images 204 can have shared layer 220. As result, when change 219 is made to shared layer 220 in one of the 350 images, the other 349 images can be updated to use shared layer 220 with change 219. This change to the other 349 images in images 204 is made without applying patches to the actual code in files for shared layer 220. Instead, these layers can be updated to reference or point to updated shared layer 224, which is shared layer 220 with change 219. Thus, image manager 212 automatically updates shared layers 218 for images 204 in response to detecting changes in shared layers 218.

Additionally, selected image 226 in images 204 can be removed from images 204. This removal of selected image 226 can be performed in response to a user input to hold automatic updates for selected image 226. Image manager 212 no longer considers selected image 226 for updates in response to removal of selected image 226 from images 204.

For example, when shared layer 220 is an operating system, an updated version of the operating system may not work with other layers in images 204. As an image in which updates to a shared layer causes problems can be removed from images 204 such that automatic updates are not performed by image manager 212 for selected image 226. These problems can be, for example, execution errors, performance hits, or other problems.

In one illustrative example, one or more technical solutions are present that overcome a technical problem with managing updates to images when large numbers of images are present. As a result, one or more technical solutions may provide a technical effect managing images through identifying shared layers that are common between images, detecting changes in a shared layer, and updating the shared layers in the images corresponding to the updated shared layer. In one illustrative example, a technical effect can be present that reduces errors in updated images and increases performance by eliminating a need to update code in each image individually.

Figure 3:
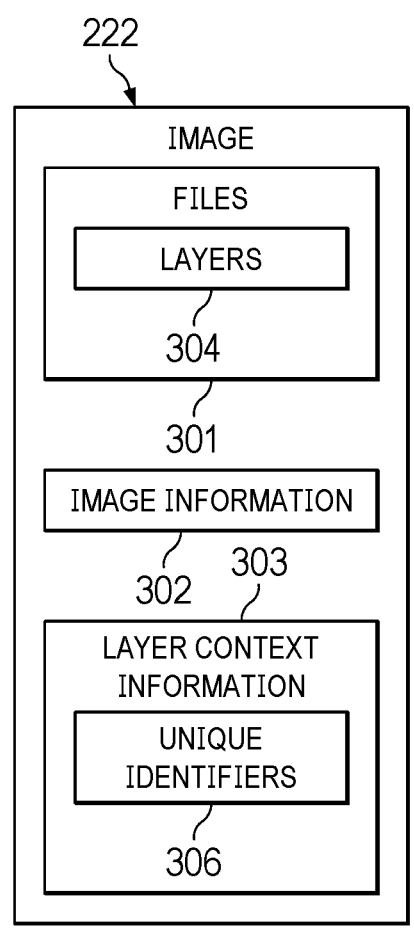
FIG. 3 is an illustration of an image that can be managed by an image manager in accordance with an illustrative embodiment.

Turning to FIG. 3, an illustration of an image that can be managed by an image manager is depicted in accordance with an illustrative embodiment. In the illustrative examples, the same reference numeral may be used in more than one figure. This reuse of a reference numeral in different figures represents the same element in the different figures.

Examples of information that can be present in image 222 are shown in this figure. As depicted, image 222 comprises files 301, image information 302, and layer context information 303.

In this example, files 301 comprise executable code for layers 304 that can be run to create the container for image 222. This executable code can be in the form of machine readable code that can be executed by a processor unit is in a computer such as binary code and libraries.

Image information 302 is metadata containing information about image 222. In this example, image information 302 can include image name, owner, creating file, size, creation time, and other information.

In this illustrative example, layer context information 303 is metadata containing information about layers 304 in files 301. For example, layer context information 303 can be a list of unique identifiers (UIDs) 306 for layers 304 for image 222. Thus, unique identifiers 306 are pointers to layers 304 for image 222 and can be used to obtain files 301 for layers 304 when files 301 for layers 304 are not stored with image 222. By using unique identifiers 306 for layers 304, storage space for images can be reduced.

As depicted in the illustrative examples, files 301 for layers 304 for image 222 can be stored in another location from image information 302 and layer context information 303 and referenced at that location by layer context information 303. In this illustrative example, when used to implement images 204 managed by image manager 212, image 222 can comprise image information 302 and layer context information 303 without files 301. In other words, image manager 212 stores image information 302 and layer context information 303 but does not store files 301 for layers 304. As a result, the files 301 for layers 304 including shared layers 218 in FIG. 2 can be retrieved when files 301 are needed to run images 204 in FIG. 2.

When image 222 is sent to a requester for use, the requester receives image 222 with image information 302 and layer context information 303. The requester can obtain files 301 for layers 304 using unique identifiers 306 and layer context information 303. In this illustrative example, unique identifiers 306 reference locations where files 301 can be found. For example, unique identifiers 306 point to a container repository containing files for layers 304. With the retrieval of files 301, image 222 is in a form that can be run to create a container.

Figures 4, 5:
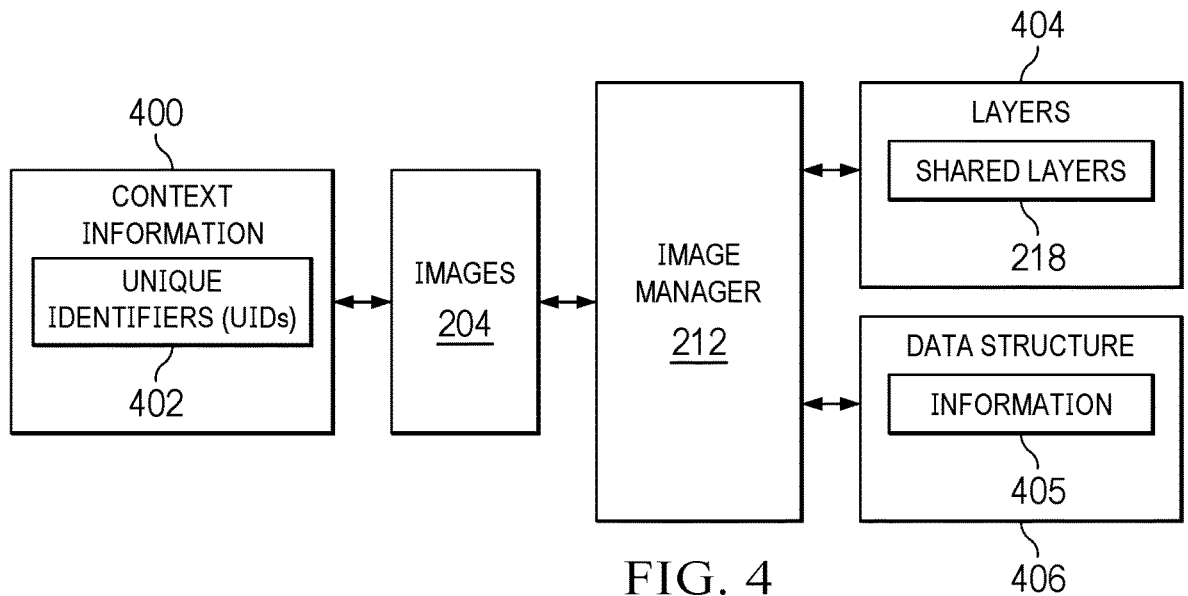
FIG. 4 is a block diagram illustrating determining shared layers present between images in accordance with an illustrative embodiment.
FIG. 5 is an illustration of a table identifying shared layers in accordance with an illustrative embodiment.

With reference next to FIG. 4, a block diagram illustrating determining shared layers present between images is depicted in accordance with an illustrative embodiment. Information for images 204 can be used to determine the presence of shared layers 218 between images 204.

Image manager 212 can determine shared layers 218 that are present between images 204 selected for update management using context information 400 for images 204. In this illustrative example, the determination of shared layers 218 present between images 204 selected for update management can be performed by image manager 212 using layer context information for images 204.

For example, image manager 212 can compare the unique identifiers (UIDs) 402 for layers 404 for images 204 with each other. Layers 404 between images 204 having unique identifiers that match form shared layers 218 between those images. For example, a selected image in images 204 can have a selected layer with a unique identifier UID1 that identifies the selected layer as a Linux operating system. Each layer in other images in images 204 having UID1 as a unique identifier is a shared layer to the selected layer.

Thus, layers 404 for these images having the unique identifier UID1 are a set of shared layers 218 in layers 404. In other words, layers 404 for images 204 having UID1 as a unique identifier are a set of shared layers 218.

Multiple sets of shared layers can be present between images 204. For example, another unique identifier UID2 in a layer in the selected image can be for a C library. A comparison of the unique identifier UD2 with the unique identifiers (UIDs) 402 for other images in images 204 can be used to identify the use of the same layer for some or all of images 204 to form another set of shared layers 218. As result, layers 404 having the unique identifier UID2 are a set of shared layers 218.

In this illustrative example, image manager 212 collects information 405 about relationships of images 204 and shared layers 218 from determining the presence of shared layers 218 between images 204. Information 405 can be stored in a data structure 406. Data structure 406 can comprise at least one of a database, a table, a linked list, a flat file, or some other suitable type of data structure that can be used to save information 405 about shared layers 218 and images 204 containing shared layers 218.

Turning next to FIG. 5, an illustration of a table identifying shared layers is depicted in accordance with an illustrative embodiment. In this illustrative example, shared layer table 500 is an example of the table in a database that can be used to implement data structure 406 in FIG. 4.

As depicted in shared layer table 500, layer column 501 identifies the layer name, UID column 502 identifies the unique identifier for the layer, layer creation date 504 identifies the date that the shared layer was created. This creation date in shared layer table 500 can be compared with a creation date for a layer in an image that is being examined for changes. The comparison can be made to determine if a change has occurred between when the shared layer was added to shared layer table 500 and when the image with the shared layer is being examined. Further, in shared layer table 500, image name 505 identifies the images in which the layer with the unique identifier is present.

As depicted in this simplified example, in row 510 the shared layer is Linux with a unique identifier of UIDA. This shared layer was created on 16.02.2022 at 5:18. In this example, UIDA uniquely identifies the shared layer Linux in a repository. UIDA can take various forms such as a hash number, an alphanumeric value, a universal resource locator, or some other value that uniquely identifies Linux from other layers. With this example, the images, Image X, Image Y, and Image Z, are images that have Linux as a layer with the unique identifier UIDA. The unique identifier can be used as an index to find images having the shared layer.

As another example, row 512 in shared layer table 500 is named centos: 7 with a unique identifier UIDB. This shared layer has a creation date of 7 Apr. 2022 at 10:18. Images having this shared layer are Image A, Image C, and Image F. In other words, these three images all have the same shared layer.

In yet another example, row 514 is for a shared layer named Data Collection with a unique identifier UIDC. This shared layer has a creation date of 11 Jun. 2022 at 17:21. In this example, the images having this shared layer are Image A and Image X.

In addition to identifying images having shared layers, shared layer table 500 can also be used to identify shared layers in an image. For example, an image name can be used to search for shared layers that are for the image having the image name in shared layer table 500. As depicted, Image A has two shared layers with unique identifiers UIDB and UIDC. Additionally, Image X has two shared layers as identified using unique identifiers UIDA and UIDC. Image Y and Image Z have a single shared layer with unique identifier UIDA. Image C and image F have a single shared layer with unique identifier UIDB.

Illustration of shared layer table 500 is provided as a simplified illustration of how information is determined from identifying shared layers between images and how the information can be stored and used by image manager 212 in FIG. 2. In other illustrative examples, shared layer table 500 can have hundreds or thousands of rows.

In this illustrative example, the image name in image name 505 column uniquely identifies the image from other images. In other illustrative examples, an image identifier can be used in addition to or in place of the image name. In other illustrative examples, a separate table can be used in which each image is represented by row with layer names and unique identifiers for layers that are shared layers in the image.

As another example, shared layer table 500 can also include additional information. For example, creation dates for images can be stored for the image names. The creation dates can be used to determine whether a change has occurred in an image since the image was examined to identify shared layers for shared layer table 500.

Figure 6:
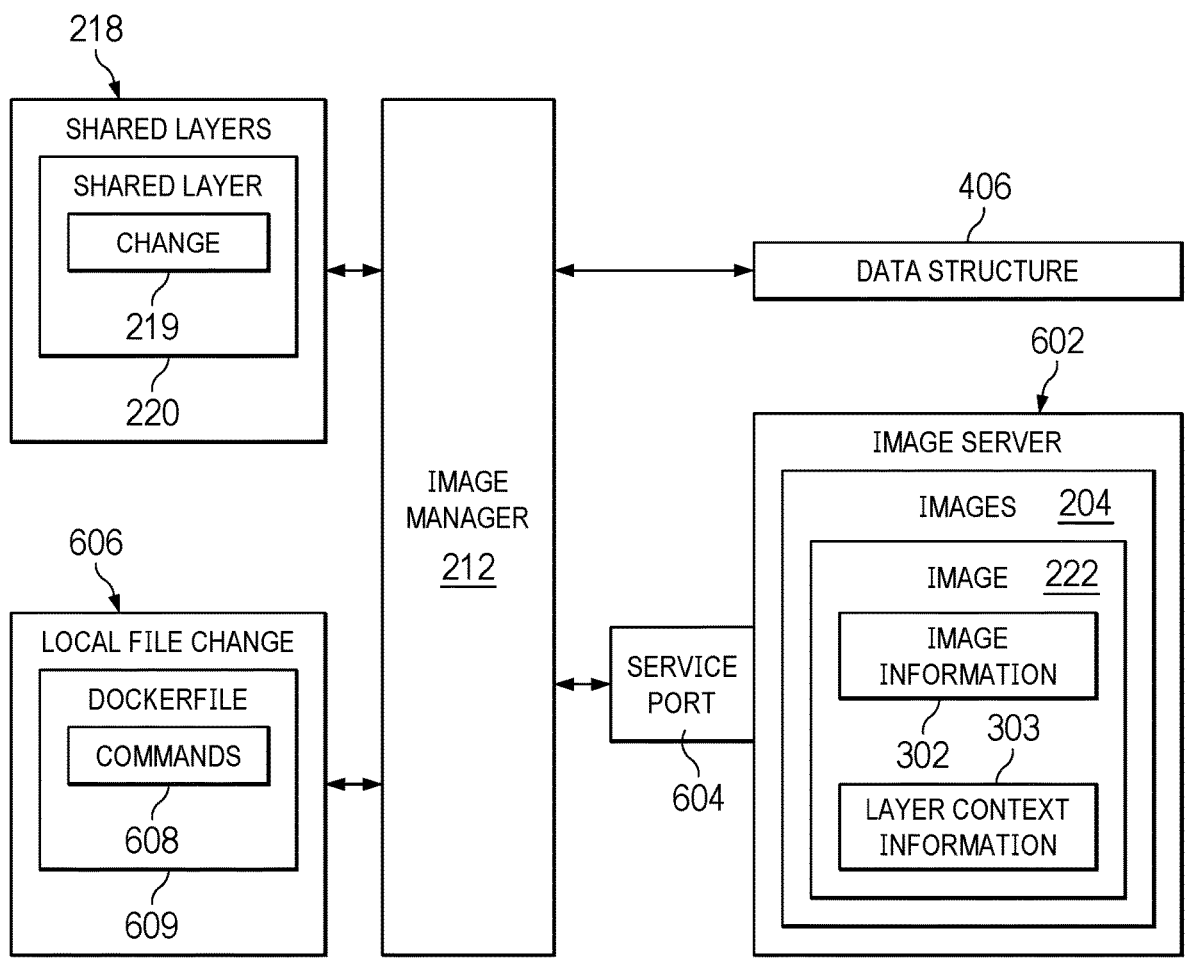
FIG. 6 is a block diagram illustrating detecting a change in a shared layer in accordance with an illustrative embodiment.

With reference next to FIG. 6, a block diagram illustrating detecting a change in a shared layer is depicted in accordance with an illustrative embodiment. In this illustrative example, image manager 212 can detect change 219 in shared layer 220 in shared layers 218 in a number of different ways. For example, image manager 212 can detect local file change 606 to shared layers 218 for images 204 by checking images 204 stored on image server 602, monitoring service port 604 for uploading images 204 to image server 602, or monitoring local file change 606. In this example, image server 602 can be a Docker server.

For example, image manager 212 check images 204 stored on image server 602 for a changed image. For example, image manager 212 can detect a change to image 222 using image information 302 for image 222 indicating that image 222 has changed. In this illustrative example, any updates or patches to image 222 is reflected in image information 302. For example, a change to a layer in image 222 results in the created time being updated to the latest build. This information obtained for image 222 can be compared with image information stored for image 222 in data structure 406.

In response to identifying a change to image 222 using image information 302, image manager 212 can determine that shared layer 220 in image 222 has changed using layer context information 303 for image 222 indicating that shared layer 220 for image 222 has changed in response to detecting the change to image 222. For example, UIDs in layer context information 303 for image 222 can be compared with stored layer context information for image 222. Layer context information 303 can be used for comparison and can be stored in data structure 406 in the form of one or more tables such as shared layer table 500 in FIG. 5.

In another illustrative example, changes to images 204 can be monitored through service port 604. For example, if image 222 is uploaded to service port 604, the detection of the uploading of image 222 can cause image manager 212 to determine whether changes have occurred to image 222 and whether changes include shared layers. With this example, images 204 are checked when images 204 are uploaded to image server 602 using service port 604.

In another example, local file change 606 can be used to determine whether an update to a shared layer has occurred for image 222. For example, image manager 212 can detect commands 608 used as part of local file change 606 to update image 222. For example, image manager 212 can detect commands 608 to update image 222. Image manager 212 can determine that shared layer 220 for image 222 has changed based on commands 608 for layers for image 222. In this depicted example, the commands can indicate shared layer 220 in the layers 218 has changed in response to detecting the commands 608 to update image 222.

For example, commands 608 can be located in Dockerfile 609 when images are used in a container orchestration platform such as Kubernetes®. These commands are executed to build image 222. A user can create Dockerfile 609 containing commands 608 that include unique identifiers for the layers for image 222. The user can then execute a Docker build command using Dockerfile 609 containing commands 608.

In this depicted example, image manager 212 detects the execution of commands 608 in Dockerfile 609 and can identify the layers referenced by the commands. The commands can use unique identifiers that can then use determine whether changes have occurred in shared layers 218 for image 222.

Figure 7:
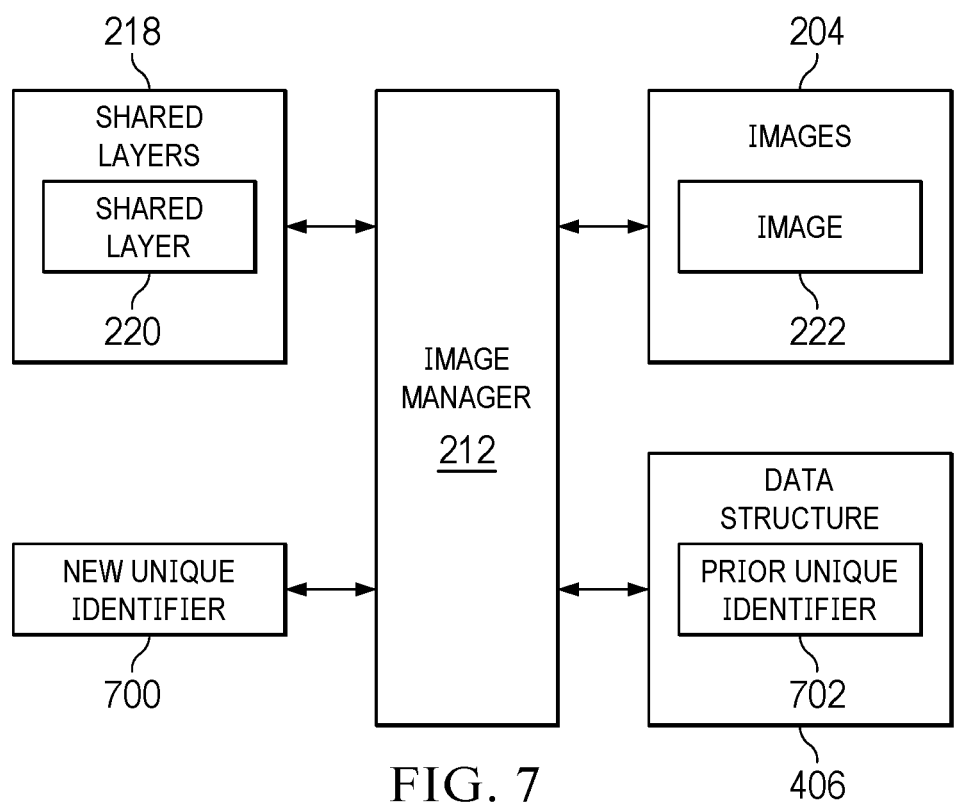
FIG. 7 is a block diagram illustrating updating shared layers in accordance with an illustrative embodiment.

Turning to FIG. 7, a block diagram illustrating updating shared layers is depicted in accordance with an illustrative embodiment. In this illustrative example, image manager 212 can update shared layer 220 in shared layers 218 in a set of images 204 having shared layer 220. This update can be performed by image manager 212 in response to detecting the change to shared layer 220.

In this illustrative example, image manager 212 determines that shared layer 220 for image 222 has changed and has new unique identifier 700 in place of prior unique identifier 702. In this example, shared layer 220 is for image 222 that has changed.

The determination of prior unique identifier 702 can be made using a creation date for shared layer 220 and information in data structure 406, which can be shared layer table 500 in FIG. 5. For example, the creation dates for shared layers 218 for image 222 can be compared with the creation dates for those shared layers stored in data structure 406. Unchanged shared layers in shared layers 218 have the same creation date. A newer creation date for shared layer 220 when compared to the entry for shared layer 220 in data structure 406 indicates that shared layer 220 has changed.

In this example, the unique identifier for shared layer 220 in data structure 406 is different from new unique identifier 700 for shared layer 220. This unique identifier in data structure 406 for shared layer 220 is prior unique identifier 702.

Further, data structure 406 can be used to identify shared layer 220 for other images in images 204. Thus, image manager 212 identifies the set of images 204 that have shared layer 220 that has changed. The shared layers 218 for images 204 can be determined using data structure 406 having prior unique identifier 702 for shared layer 220 that has changed to new unique identifier 700.

Image manager 212 updates shared layer 220 for the set of the images using new unique identifier 700 for the shared layer that has changed. Updates can be made to change prior unique identifier 702 to new unique identifier 700 for shared layer 220 for images 204 as identified using data structure 406. The update can be performed in a number of different ways.

As result, the set of shared layers 218 in the set of images 204 are updated. This updating can be performed without needing to apply patches to change code in files in the set of images 204.

Computer system 210 in FIG. 2 can be configured to perform at least one of the steps, operations, or actions described in the different illustrative examples using software, hardware, firmware, or a combination thereof. As a result, computer system 210 operates as a special purpose computer system in which image manager 212 in computer system 210 enables managing automatically images. In particular, image manager 212 transforms computer system 210 into a special purpose computer system as compared to currently available general computer systems that do not have image manager 212.

In the illustrative example, the use of image manager 212 in computer system 210 integrates processes into a practical application by managing updates to images for containers that increases the performance of computer system 210. In other words, image manager 212 in computer system 210 is directed to a practical application of processes integrated into image manager 212 in computer system that identifies shared layers in images, detects changes to shared layers in the images, and updates shared layers with changes in the images.

The illustration of image environment 200 and the different components in FIGS. 2-7 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, images 204 can be used to create containers 206 on one or more container orchestration platforms in addition to or in place of container orchestration platform 208. As another example, another table in addition shared layer table 500 can be used for data structure 406. For example, an image table can be used to identify images and shared layers for images. In other words, the image name can be indexed to identify shared layers that the image uses.

Figure 8:
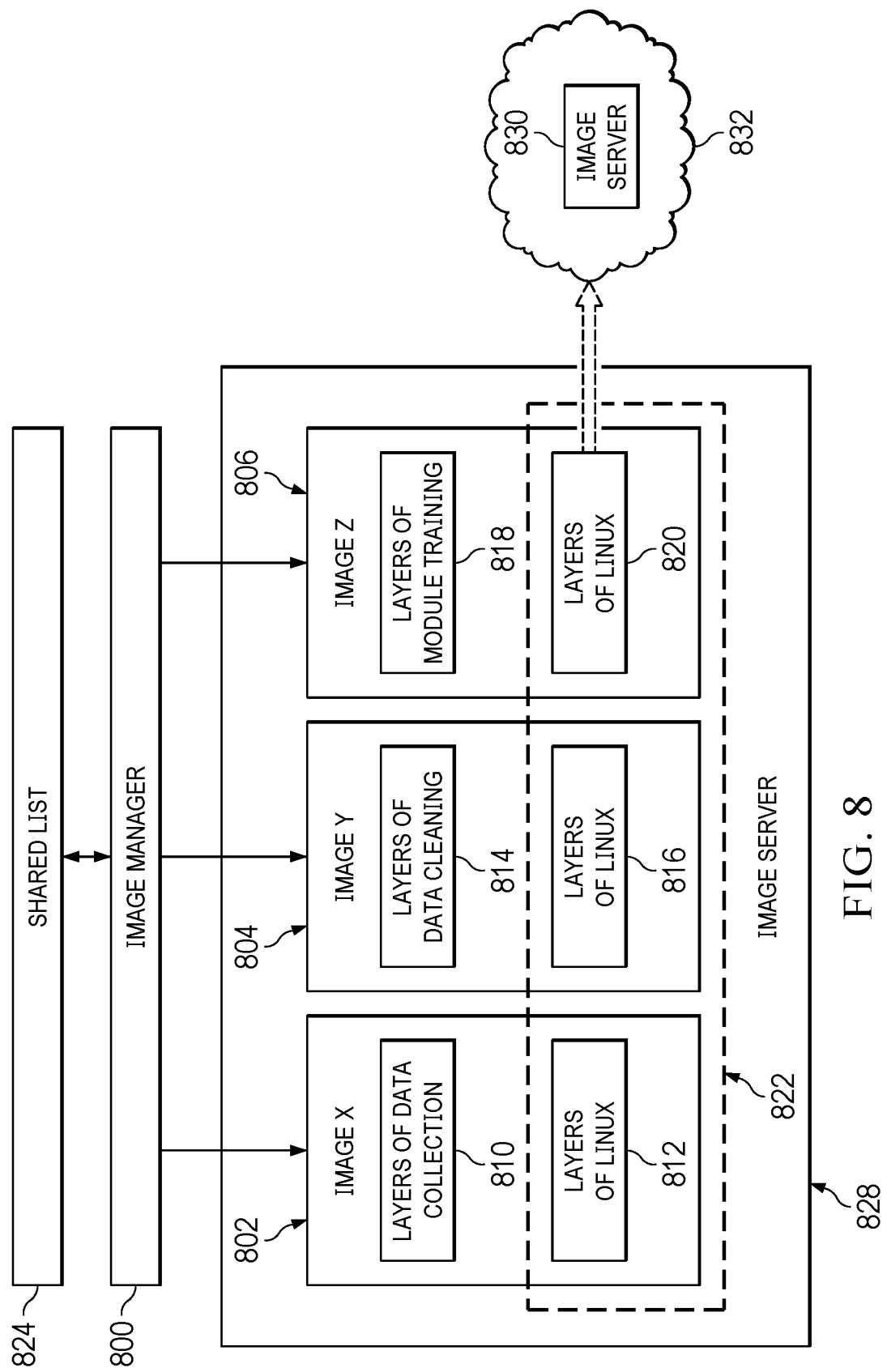
FIG. 8 is an illustration of an image manager for images used in a pipeline workload in accordance with an illustrative embodiment.

With reference now to FIG. 8, an illustration of an image manager for images used in a pipeline workload is depicted in accordance with an illustrative embodiment. In this illustrative example, image manager 800 is an example of an implementation for image manager 212 in FIG. 2. In this example, image manager 800 manages Image X 802, Image Y 804, and Image Z 806. Each of these images can be run to create containers for an artificial intelligence pipeline in this example. Only three images are shown to illustrate the different aspects of how image manager 800 can manage images. When implemented, image manager 800 can manage many more images such as hundreds or thousands of images.

In this example, Image X 802, Image Y 804, and Image Z 806 have been selected for management by image manager 800. In this example, Image X 802 comprises layers of data collection 810 and layers of Linux 812. Image Y 804 comprises layers of data cleaning 814 and layers of Linux 816, and Image Z 806 comprises layers of module training 818 and layers of Linux 820.

In this depicted example, image manager 800 examines the images and identifies shared layers 822 which comprise layers of Linux 812, layers of Linux 816, and layers of Linux 820. The shared layers have the same unique identifiers in this example. Image manager 800 builds shared list 824 for these images and shared layers 822.

The identification of shared layers 822 can be determined using unique identifiers for shared layers 822 found in layer context information for the images. In this illustrative example, layer context information can be obtained by examining the images or from detecting commands creating the images.

In this illustrative example, image manager 800 can monitor the images to detect an update performed on one or more of the images. For example, image manager 800 can detect a change to shared layers 822 by checking images stored in image server 830, monitoring service port for uploading images, or monitoring a local file change.

For example, a user may perform a local file change that patches Image X 802. This patch changes layers of Linux 812, resulting in a change in the unique identifiers for layers of Linux 812. In response to detecting this change, image manager 800 can update the unique identifier for layers of Linux 816 in Image Y 804 and layers of Linux 820 for Image Z 806. With this update, all of shared layers 822 now have the same unique identifier. This update is also made to shared list 824 by image manager 800 for future comparisons.

In this illustrative example, when images are updated, those updated images can be uploaded to other locations such as image server 830 in cloud 832. Image server 830 can be a Docker server. Thus, image manager 800 can manage complex image updates for large numbers of images for a pipeline workload. These images for a pipeline workload can be hundreds of thousands of images. Image manager 800 can identify shared layers between images, monitor images for changes to shared layers, and update corresponding shared layers for other images in response to detecting a change to shared layers.

An image can be removed from shared list 824 when automatic updates to the shared layers are not desired. For example, if an update to shared layer in an image in shared list 824 causes other layers to perform incorrectly or with errors, that image can be removed from shared list 824. In this manner, errors caused by current techniques for updates can be avoided and the quality of a pipeline workload can be increased.

Figure 9:
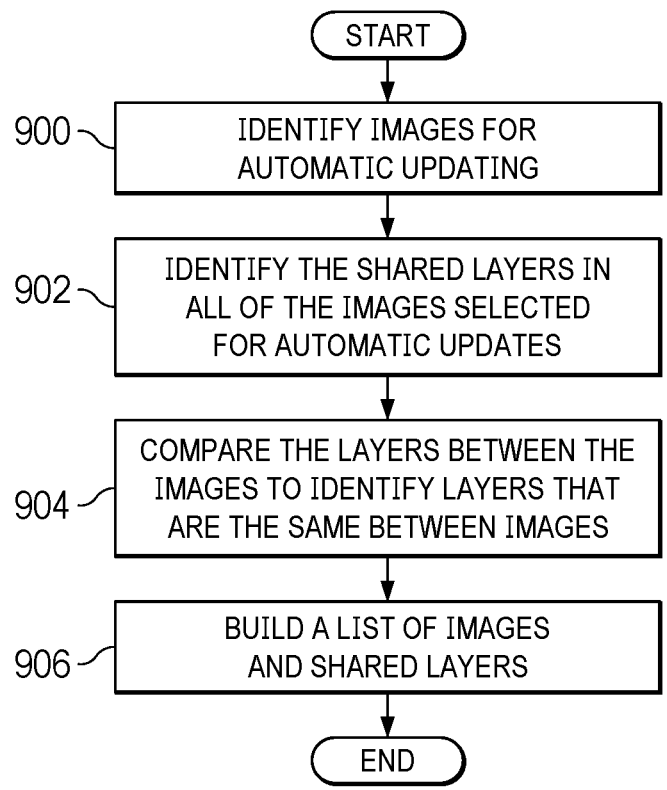
FIG. 9 is flowchart of a process for identifying shared layers in images selected for automatic updates in accordance with an illustrative embodiment.

Turning next to FIG. 9, a flowchart of a process for identifying shared layers in images selected for automatic updates is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in image manager 212 in computer system 210 in FIG. 2 and image manager 800 in FIG. 8.

The process begins by identifying images for automatic updating (step 900). The process identifies the shared layers in all of the images selected for automatic updates (step 902). In step 902, the identification of the shared layers can be performed by identifying the unique identifiers for the shared layers. These unique identifiers can be used to retrieve files for the shared layers from a container repository.

The process compares the layers between the images to identify layers that are the same between images (step 904). This comparison can be performed by comparing unique identifiers between layers in the images. The layers having the same unique identifiers between images are shared layers.

The process builds a list of images and shared layers (step 906). The process terminates thereafter. In step 906, this list can be in the form of a data structure such as data structure 406 in FIG. 4 and can be in the form of shared layer table 500 in FIG. 5.

This process can be repeated when new images are to be added. Additionally, images can be removed from the list such that automatic updates are not made to those removed images.

Figure 10:
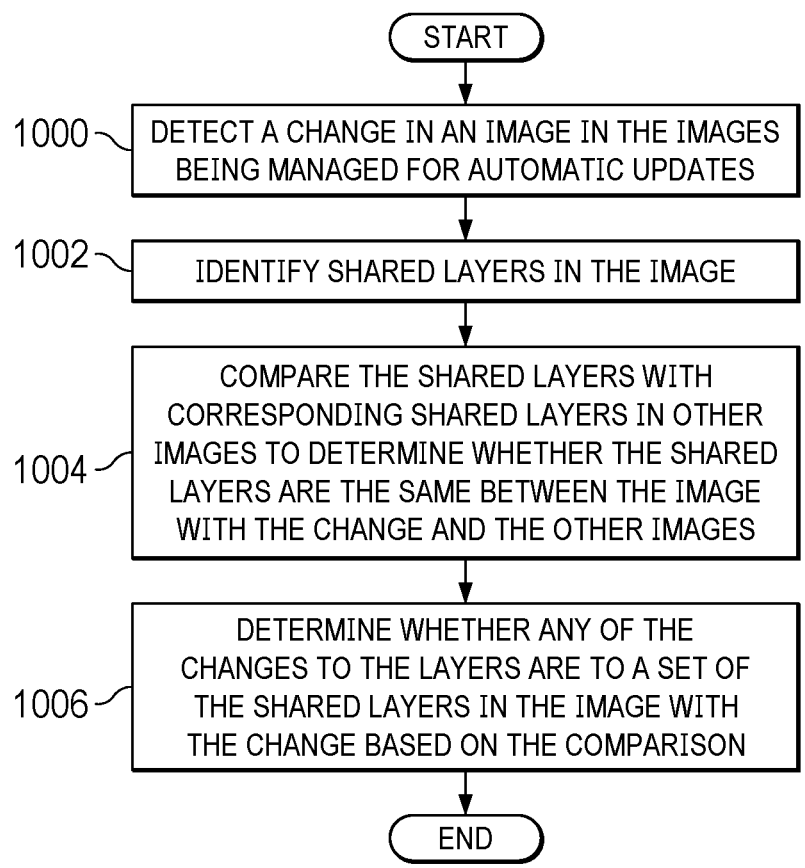
FIG. 10 is a flowchart of a process for detecting changes to shared layers between images in accordance with an illustrative embodiment.

With reference now to FIG. 10, a flowchart of a process for detecting changes to shared layers between images is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in image manager 212 in computer system 210 in FIG. 2 and image manager 800 in FIG. 8.

The process begins by detecting a change in an image in the images being managed for automatic updates (step 1000). The process identifies shared layers in the image (step 1002). The process compares the shared layers with corresponding shared layers in other images to determine whether the shared layers are the same between the image with the change and the other images (step 1004).

The process determines whether any of the changes to the layers are to a set of the shared layers in the image with the change based on the comparison (step 1006). The process terminates thereafter.

Figure 11:
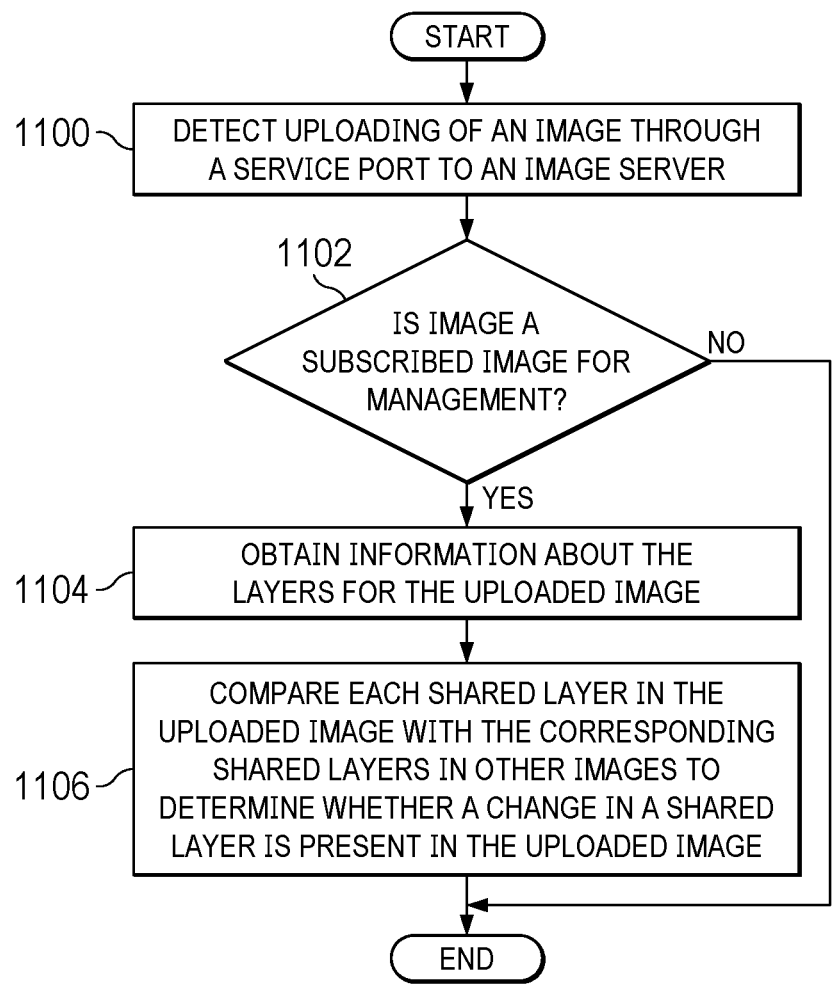
FIG. 11 is a flowchart of a process for monitoring a service port to detect changes to shared layers between images in accordance with an illustrative embodiment.

With reference now to FIG. 11, a flowchart of a process for monitoring a service port to detect changes to shared layers between images is depicted in accordance with an illustrative embodiment. The process in FIG. 11 can be implemented in hardware, software, or both. When implemented in software, the process can take the form of program instructions that is run by one of more processor units located in one or more hardware devices in one or more computer systems. For example, the process can be implemented in image manager 212 in computer system 210 in FIG. 2 and image manager 800 in FIG. 8.

The process begins by detecting uploading of an image through a service port to an image server (step 1100). The process determines if the image is a subscribed image for management (step 1102). If the updated image is not a subscribed image for management, the process terminates.

Otherwise, the process obtains information about the layers for the uploaded image (step 1104). In step 1104, the layer information is layer context information that can be obtained from a folder of folders where images are stored. For example, these folders can be in a container repository. A data structure containing shared layer information such as shared layer table 500 in FIG. 5 can be used to determine which images have shared layers that should be compared to each other.

The process compares each shared layer in the uploaded image with the corresponding shared layers in other images to determine whether a change in a shared layer is present in the uploaded image (step 1106). This determination can be made by comparing the unique identifier in a shared layer in the uploaded image with corresponding shared layers in other images. The process terminates thereafter.

Figure 12:
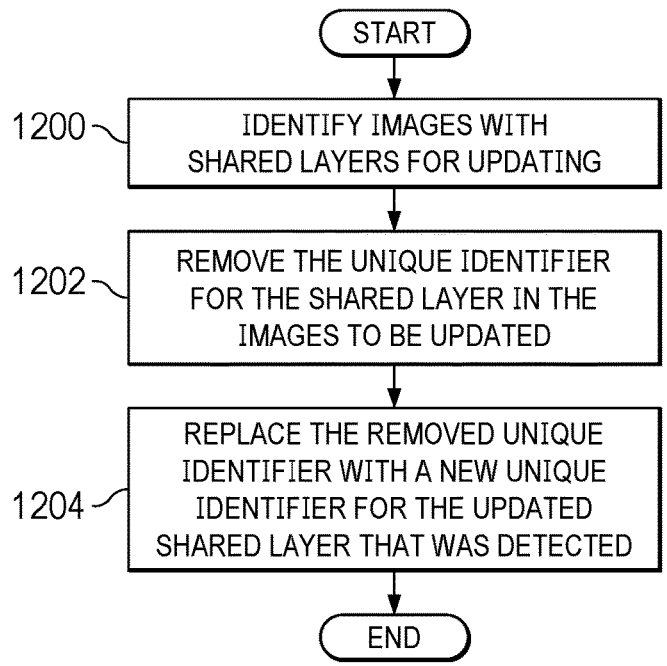
FIG. 12 is a flowchart of a process for updating shared layers between images in accordance with an illustrative embodiment.

With reference now to FIG. 12, a flowchart of a process for updating shared layers between images is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in image manager 212 in computer system 210 in FIG. 2 and image manager 800 in FIG. 8.

The process begins by identifying images with shared layers for updating (step 1200). The process removes the unique identifier for the shared layer in the images to be updated (step 1202). The process replaces the removed unique identifier with a new unique identifier for the updated shared layer that was detected (step 1204). The process terminates thereafter.

In this illustrative example, when a shared layer is updated, that updated shared layer can be stored in a repository such as a container repository. A new unique identifier is created for the updated shared layer. This new unique identifier can be used to replace the prior one such that the image is now pointing to the updated shared layer rather than the old shared layer without an update.

Only a single file is needed for a shared layer that is used in multiple images. The unique identifier is used to retrieve that shared layer when the image is ready to run to create a container. As result, the file containing code for updated shared layer can be retrieved for use in the image rather than patching the file after retrieval prior to running the image.

Figure 13:
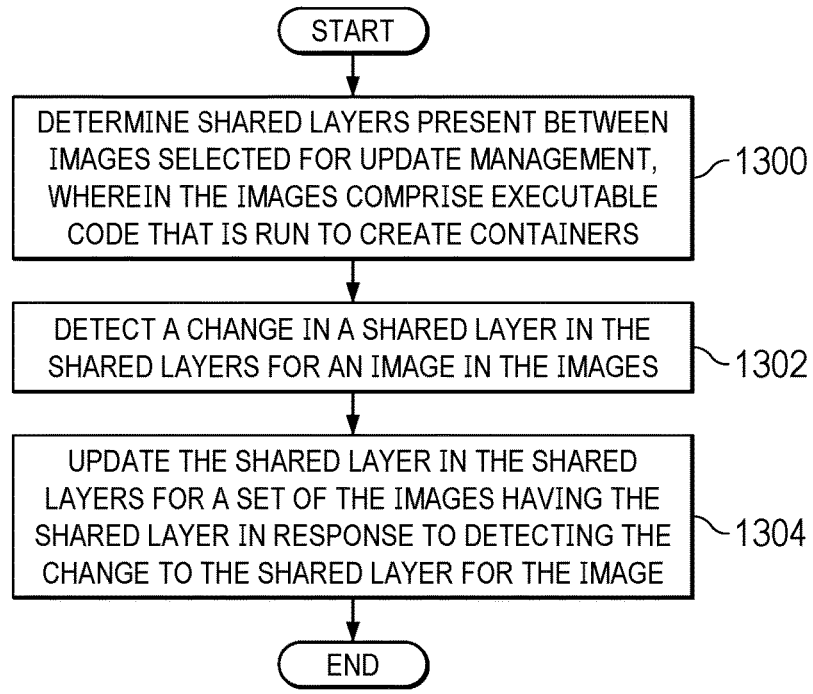
FIG. 13 is a flowchart of a process for updating a shared layer for images in accordance with an illustrative embodiment.

Turning now to FIG. 13, a flowchart of a process for updating a shared layer for images is depicted in accordance with an illustrative embodiment. The process in FIG. 13 can be implemented in hardware, software, or both. When implemented in software, the process can take the form of program instructions that is run by one of more processor units located in one or more hardware devices in one or more computer systems. For example, the process can be implemented in image manager 212 in computer system 210 in FIG. 2 and image manager 800 in FIG. 8.

The process begins by determining shared layers present between images selected for update management, wherein the images comprise executable code that is run to create containers (step 1300). The process detects a change in a shared layer in the shared layers for an image in the images (step 1302). The process updates the shared layer in the shared layers for a set of the images having the shared layer in response to detecting the change to the shared layer for the image (step 1304). The process terminates thereafter.

Figure 14:
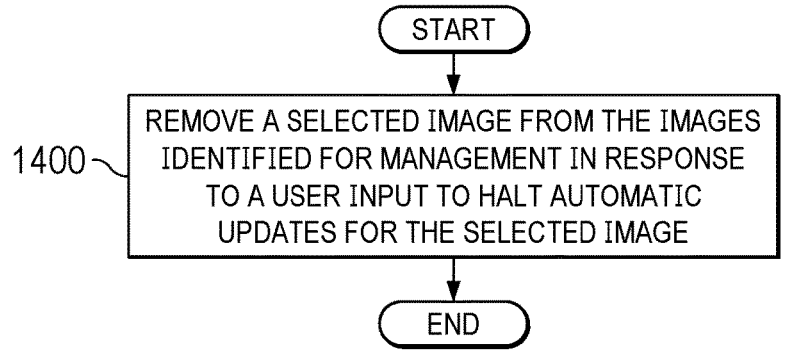
FIG. 14 is a flowchart of a process for removing a selected image in accordance with an illustrative embodiment.

Turning to FIG. 14, a flowchart of a process for removing a selected image is depicted in accordance with an illustrative embodiment. The process illustrated in FIG. 14 is an example of an additional step that can be used with the steps in FIG. 13. The process removes a selected image from the images identified for management in response to a user input to halt automatic updates for the selected image (step 1400). The process terminates thereafter.

Figure 15:
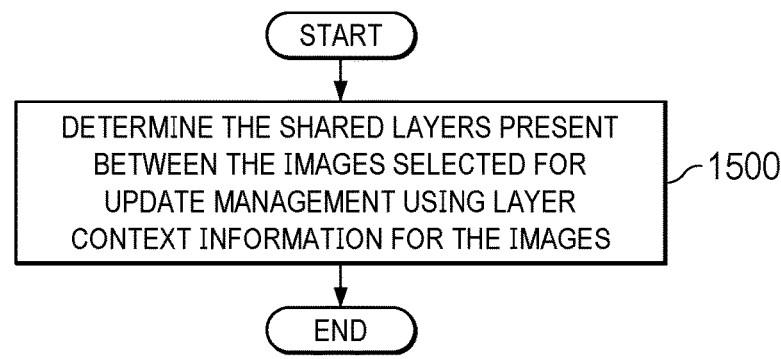
FIG. 15 is a flowchart of a process for determining that shared layers are present between images in accordance with an illustrative embodiment.

With reference to FIG. 15, a flowchart of a process for determining that shared layers are present between images is depicted in accordance with an illustrative embodiment. The process illustrated in FIG. 15 is an example of one implementation for step 1300 in FIG. 13. The process determines the shared layers present between the images selected for update management using layer context information for the images (step 1500). The process terminates thereafter.

Figure 16:
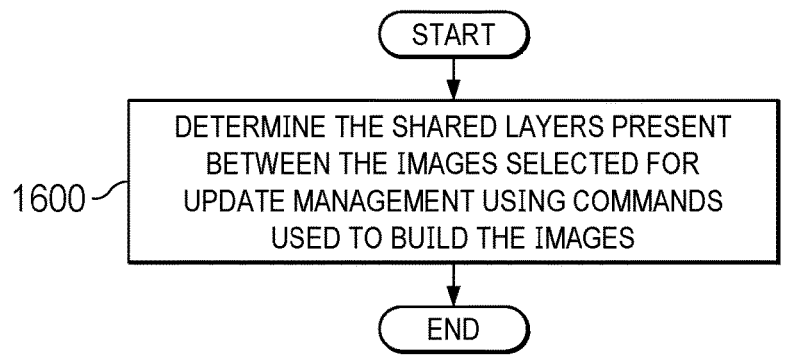
FIG. 16 is a flowchart of a process for determining that shared layers are present between images in accordance with an illustrative embodiment.

Turning next to FIG. 16, a flowchart of a process for determining that shared layers are present between images is depicted in accordance with an illustrative embodiment. The process illustrated in FIG. 16 is an example of one implementation for step 1300 in FIG. 13.

The process determines the shared layers present between the images selected for update management using commands used to build the images (step 1600). The process terminates thereafter.

Figure 17:
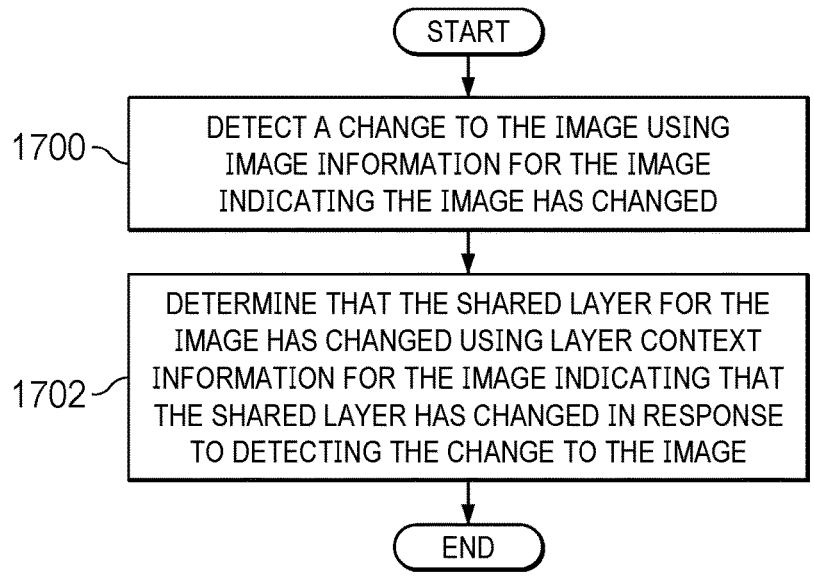
FIG. 17 is a flowchart of a process for detecting a change to a shared layer in accordance with an illustrative embodiment.

Turning to FIG. 17, a flowchart of a process for detecting a change to a shared layer is depicted in accordance with an illustrative embodiment. The process illustrated in FIG. 17 is an example of one implementation for step 1302 in FIG. 13.

The process begins by detecting a change to the image using image information for the image indicating the image has changed (step 1700). The process determines that the shared layer for the image has changed using layer context information for the image indicating that the shared layer has changed in response to detecting the change to the image (step 1702). The process terminates thereafter.

Figure 18:
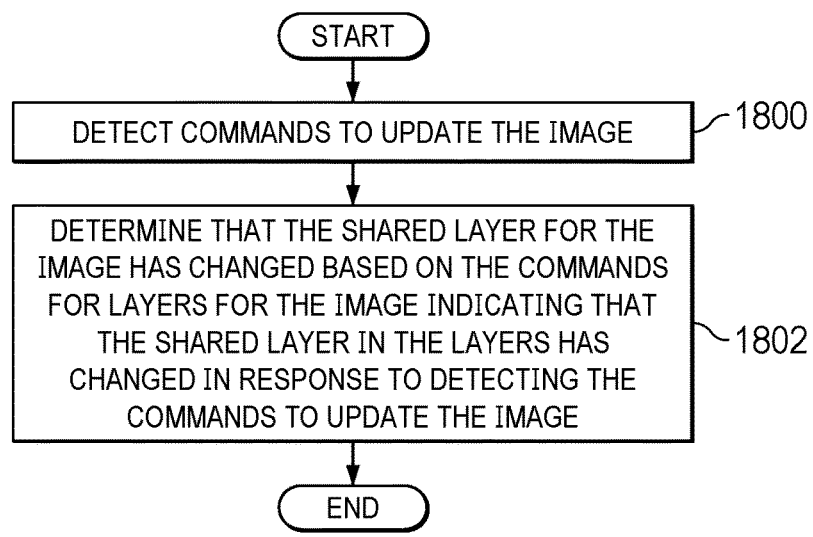
FIG. 18 is a flowchart of a process for detecting commands to update an image in accordance with an illustrative embodiment.

With reference to FIG. 18, a flowchart of a process for detecting commands to update an image is depicted in accordance with an illustrative embodiment. The process illustrated in FIG. 18 is an example of one implementation for step 1302 in FIG. 13.

The process begins by detecting commands to update the image (step 1800). The process determines that the shared layer for the image has changed based on the commands for layers for the image indicating that the shared layer in the layers has changed in response to detecting the commands to update the image (step 1802). The process terminates thereafter.

Figure 19:
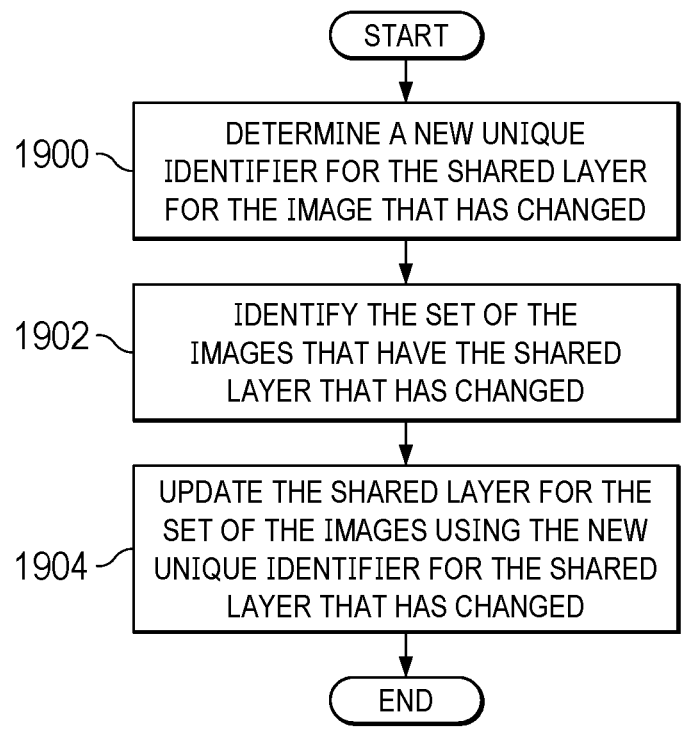
FIG. 19 is a flowchart of a process for updating a shared layer in accordance with an illustrative embodiment.

Turning to FIG. 19, a flowchart of a process for updating a shared layer is depicted in accordance with an illustrative embodiment. The process illustrated in FIG. 19 is an example of one implementation for step 1304 in FIG. 13.

The process begins by determining a new unique identifier for the shared layer for the image that has changed (step 1900). The process identifies the set of the images that have the shared layer that has changed (step 1902). The process updates the shared layer for the set of the images using the new unique identifier for the shared layer that has changed (step 1904). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 20:
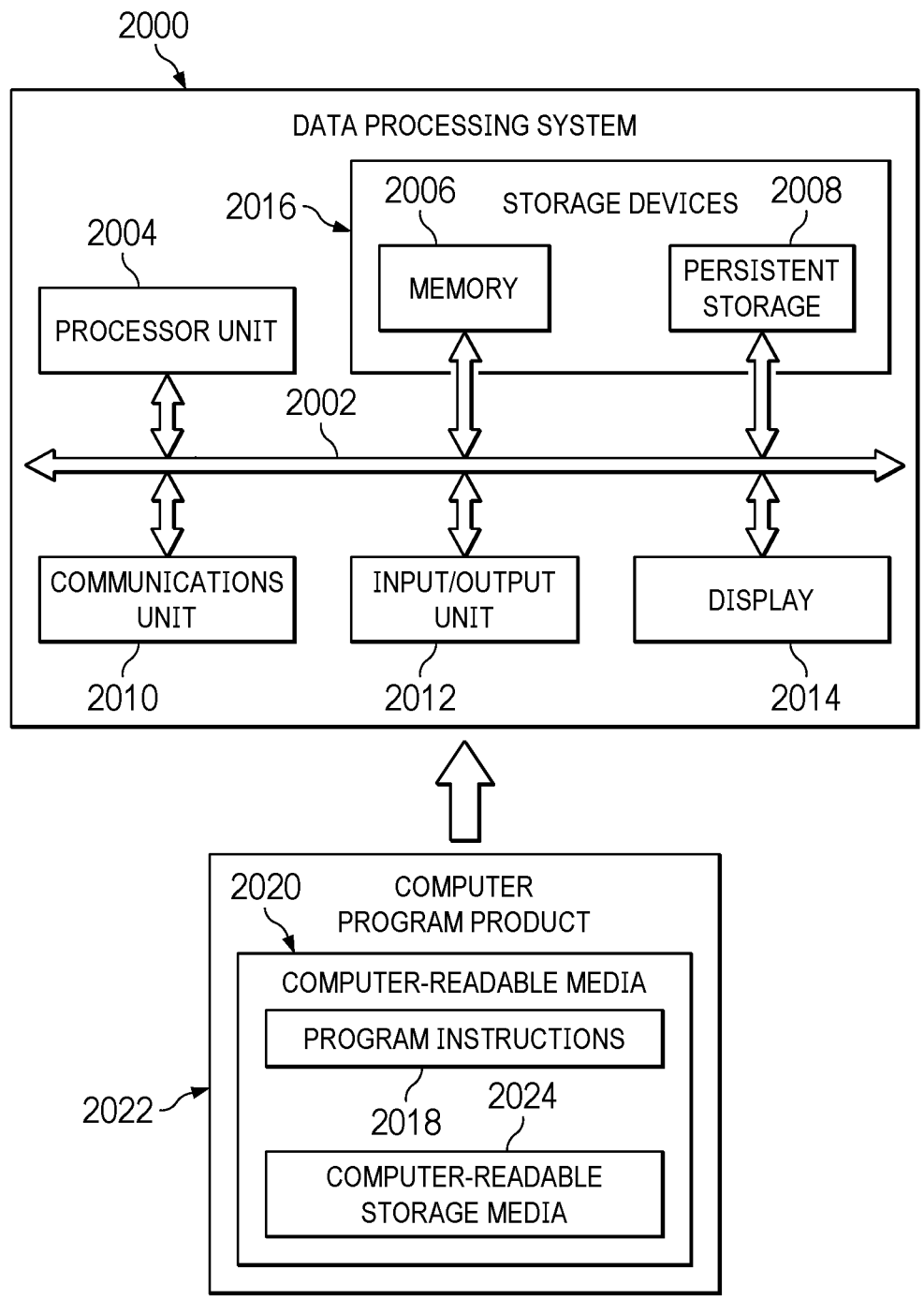
FIG. 20 is a block diagram of a data processing system in accordance with an illustrative embodiment.

Turning now to FIG. 20, a block diagram of a data processing system is depicted in accordance with an illustrative embodiment. Data processing system 2000 can be used to implement computers and computing devices in computing environment 100 in FIG. 1. Data processing system 2000 can also be used to implement computer system 210 in FIG. 2. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can may be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 may take various forms, depending on the particular implementation.

For example, persistent storage 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 may provide a connection for user input through at least one of a keyboard, a mouse, or some other suitable input device. Further, input/output unit 2012 may send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which may be located in a memory, such as memory 2006.

These instructions are referred to as program instructions, computer usable program instructions, or computer-readable program instructions that can be read and executed by a processor in processor unit 2004. The program instructions in the different embodiments can be embodied on different physical or computer-readable storage media, such as memory 2006 or persistent storage 2008.

Program instructions 2018 is located in a functional form on computer-readable media 2020 that is selectively removable and can be loaded onto or transferred to data processing system 2000 for execution by processor unit 2004. Program instructions 2018 and computer-readable media 2020 form computer program product 2022 in these illustrative examples. In the illustrative example, computer-readable media 2020 is computer-readable storage media 2024.

Computer-readable storage media 2024 is a physical or tangible storage device used to store program instructions 2018 rather than a medium that propagates or transmits program instructions 2018. Computer-readable storage media 2024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2018 can be transferred to data processing system 2000 using a computer-readable signal media. The computer-readable signal media are signals and can be, for example, a propagated data signal containing program instructions 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2020" can be singular or plural. For example, program instructions 2018 can be located in computer-readable media 2020 in the form of a single storage device or system. In another example, program instructions 2018 can be located in computer-readable media 2020 that is distributed in multiple data processing systems. In other words, some instructions in program instructions 2018 can be located in one data processing system while other instructions in program instructions 2018 can be located in one data processing system. For example, a portion of program instructions 2018 can be located in computer-readable media 2020 in a server computer while another portion of program instructions 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, may be incorporated in processor unit 2004 in some illustrative examples. The different illustrative embodiments can be implemented in a data processing system including components in addition to or in place of those illustrated for data processing system 2000. Other components shown in FIG. 20 can be varied from the illustrative examples shown. The different embodiments can be implemented using any hardware device or system capable of running program instructions 2018.

Thus, illustrative embodiments of the present invention provide a computer implemented method, apparatus, system, and computer program product for managing updates to images. According to one illustrative embodiment, a computer implemented method manages updates to images. A computer system determines shared layers present between the images selected for update management. The images comprise executable code that runs to create containers. The computer system detects a change in a shared layer in the shared layers for an image in the images. The computer system updates the shared layer in the shared layers in a set of the images having the shared layer in response to detecting the change to the shared layer for the image. According to other illustrative embodiments, a computer system, and a computer program product for managing updates to images are provided. As a result, the illustrative embodiments can provide a technical effect of increasing the performance in reducing errors in updating images and increasing performance updating images by eliminating a need to update the code in each image individually.

In the illustrative examples, errors are reduced through automated updating of shared layers rather than individually patching images. Further, performance is increased through replacing pointers such as unique identifiers to a shared layer in multiple images rather than patching or copying patched files to images. The use of a new unique identifier to an updated shared layer in images having the shared layer results in those images sharing the updated layers without needing to individually patch files for each image. In the illustrative example, the image manager does not store the files for the shared layers Instead, updates to shared layers are made by updating unique identifiers pointing to the locations of the shared layers. As a result, an updated shared layer can be pulled from a repository using the new unique identifier of the updated shared layer in contrast to patching individual files in the images after the files have been retrieved for use in creating containers.

Further, errors are reduced, and performance is increased in pipeline workloads that can have hundreds or thousands of steps in which each step is performed by container formed from running files in an image.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing updates to images, the computer implemented method comprising:
   determining, by a computer system, shared layers present between the images selected for update management, wherein the images comprise executable code that is run to create containers;
   detecting, by the computer system, a change in a shared layer in the shared layers for an image in the images; and
   updating, by the computer system, the shared layer in the shared layers for a set of the images having the shared layer in response to detecting the change to the shared layer for the image.

2. The computer implemented method of claim 1 further comprising:
   removing, by the computer system, a selected image from the images identified for management in response to a user input to halt automatic updates for the selected image.

3. The computer implemented method of claim 1, wherein determining, by the computer system, the shared layers present between the images selected for the update management comprises:
   determining, by the computer system, the shared layers present between the images selected for the update management using layer context information for the images.

4. The computer implemented method of claim 1, wherein determining, by the computer system, the shared layers present between the images selected for the update management comprises:
   determining, by the computer system, the shared layers present between the images selected for update management using commands used to build the images.

5. The computer implemented method of claim 1, wherein detecting, by the computer system, the change in the shared layer in the shared layers for the image in the images comprises:
   detecting, by the computer system, a change to the image using image information for the image indicating the image has changed; and
   determining, by the computer system, that the shared layer for the image has changed using layer context information for the image indicating that the shared layer has changed in response to detecting the change to the image.

6. The computer implemented method of claim 1, wherein detecting, by the computer system, the change in the shared layer in the shared layers for the image in the images comprises:
   detecting, by the computer system, commands to update the image; and
   determining, by the computer system, that the shared layer for the image has changed based on the commands for layers in for the image indicating that the shared layer in the layers has changed in response to detecting the commands to update the image.

7. The computer implemented method of claim 1, wherein updating, by the computer system, the shared layer in the shared layers in the set of the images having the shared layer in response to detecting the change to the shared layer for the image comprises:
   determining, by the computer system, a new unique identifier for the shared layer for the image that has changed;
   identifying, by the computer system, the set of the images that have the shared layer that has changed; and
   updating, by the computer system, the shared layer for the set of the images using the new unique identifier for the shared layer that has changed.

8. The computer implemented method of claim 1, wherein the images form an artificial intelligence pipeline and the images are for the containers that performs steps in the artificial intelligence pipeline.

9. A computer system comprising:
   comprising a number of processor units, wherein the number of processor units executes program instructions to:
   determine shared layers present between images selected for update management, wherein the images comprise executable code that is run to create containers;
   detect a change in a shared layer in the shared layers for an image in the images; and
   update the shared layer in the shared layers for a set of the images having the shared layer in response to detecting the change to the shared layer for the image.

10. The computer system of claim 9, wherein the number of processor units executes program instructions to:
    remove a selected image from the images identified for management in response to a user input to halt automatic updates for the selected image.

11. The computer system of claim 9, wherein in determining the shared layers present between the images selected for the update management, the number of processor units executes program instructions to:
    determine the shared layers present between the images selected for the update management using layer context information for the images.

12. The computer system of claim 9, wherein in determining the shared layers present between the images selected for the update management, the number of processor units executes program instructions to:
determine the shared layers present between the images selected for the update management using commands used to build the images.

13. The computer system of claim 9, wherein in detecting the change in the shared layer in the shared layers for the image in the images, the number of processor units executes program instructions to:
detect a change to the image using image information for the image indicating the image has changed; and
determine that the shared layer for the image has changed using layer context information for the image indicating that the shared layer has changed in response to detecting the change to the image.

14. The computer system of claim 9, wherein in detecting the change in the shared layer in the shared layers for the image in the images, the number of processor units executes program instructions to:
detect commands to update the image; and
determine that the shared layer for the image has changed based on the commands for layers in for the image indicating that the shared layer in the layers has changed in response to detecting the commands to update the image.

15. The computer system of claim 9, wherein in updating the shared layer in the shared layers in the set of the images having the shared layer in response to detecting the change to the shared layer for the image, the number of processor units executes program instructions to:
determine a new unique identifier for the shared layer for the image that has changed;
identify the set of the images that have the shared layer that has changed; and
update the shared layer for the set of the images using the new unique identifier for the shared layer that has changed.

16. The computer system of claim 9, wherein the images form an artificial intelligence pipeline and the images are for the containers that performs steps in the artificial intelligence pipeline.

17. A computer program product for managing updates to images, the computer program product comprising a computer-readable storage medium having program instructions embodied therewith, the program instructions executable by a computer system to cause the computer system to perform a method of:
determining, by the computer system, shared layers present between the images selected for update management, wherein the images comprise executable code that is run to create containers;
detecting, by the computer system, a change in a shared layer in the shared layers for an image in the images; and
updating, by the computer system, the shared layer in the shared layers for a set of the images having the shared layer in response to detecting the change to the shared layer for the image.

18. The computer program product of claim 17 further comprising:
removing, by the computer system, a selected image from the images identified for management in response to a user input to halt automatic updates for the selected image.

19. The computer program product of claim 17, wherein determining, by the computer system, the shared layers present between the images selected for the update management comprises:
determining, by the computer system, the shared layers present between the images selected for the update management using layer context information for the images.

20. The computer program product of claim 17, wherein determining, by the computer system, the shared layers present between the images selected for the update comprises:
determining, by the computer system, the shared layers present between the images selected for the update management using commands used to build the images.

* * * * *